United States Patent
Takanashi et al.

(10) Patent No.: US 8,395,983 B2
(45) Date of Patent: Mar. 12, 2013

(54) OPTICAL PICKUP APPARATUS

(71) Applicants: Keita Takanashi, Ome (JP); Noriyuki Hiramatsu, Higashimurayama (JP); Toru Kajino, Kodaira (JP)

(72) Inventors: Keita Takanashi, Ome (JP); Noriyuki Hiramatsu, Higashimurayama (JP); Toru Kajino, Kodaira (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 0 days.

(21) Appl. No.: 13/624,568

(22) Filed: Sep. 21, 2012

(65) Prior Publication Data

US 2013/0021893 A1 Jan. 24, 2013

Related U.S. Application Data

(63) Continuation of application No. 13/023,433, filed on Feb. 8, 2011, now Pat. No. 8,295,147.

(30) Foreign Application Priority Data

Feb. 17, 2010 (JP) .................. 2010-32123
Feb. 25, 2010 (JP) .................. 2010-40412
Jan. 24, 2011 (JP) .................. 2011-11792

(51) Int. Cl.
*G11B 7/00* (2006.01)
(52) U.S. Cl. .............. 369/122; 369/121; 369/116
(58) Field of Classification Search ............ 369/121, 369/122, 116; 372/29.01, 29.014, 38.07, 372/38.08, 81, 82
See application file for complete search history.

(56) References Cited

U.S. PATENT DOCUMENTS

| | | | |
|---|---|---|---|
| 4,763,434 | A | 8/1988 | Horneff |
| 4,926,433 | A | 5/1990 | Imamura et al. |
| 5,051,815 | A | 9/1991 | Hidaka |
| 2002/0154592 | A1 | 10/2002 | Tanaka et al. |
| 2005/0201434 | A1* | 9/2005 | Tatsuta ............... 372/38.02 |
| 2006/0028931 | A1* | 2/2006 | Wade .................. 369/112.01 |
| 2008/0094980 | A1 | 4/2008 | Yajima et al. |
| 2011/0161994 | A1 | 6/2011 | Minamiguchi et al. |

FOREIGN PATENT DOCUMENTS

JP 2004-192705 7/2004

* cited by examiner

*Primary Examiner* — Thang Tran
(74) *Attorney, Agent, or Firm* — SoCal IP Law Group LLP; Steven C. Sereboff; John E. Gunther

(57) ABSTRACT

An optical-pickup apparatus configured to prevent noise caused by return light by superposing a high-frequency signal, generated from a high-frequency signal generation circuit, on a driving signal to be supplied to a laser diode, the optical-pickup apparatus includes: a high-frequency superimposition integrated circuit including the high-frequency signal generation circuit; first wiring connected between an anode of the laser diode and the high-frequency superimposition integrated circuit; and second wiring connected between a cathode of the laser diode and the high-frequency-superimposition integrated circuit, the laser diode and the high-frequency superimposition integrated circuit mounted on a circuit board, the first wiring and the second wiring arranged, for the most part, in a region where the laser diode is arranged, the second wiring configured to pass through between an anode terminal of the laser diode and an anode terminal of a monitor diode.

5 Claims, 9 Drawing Sheets

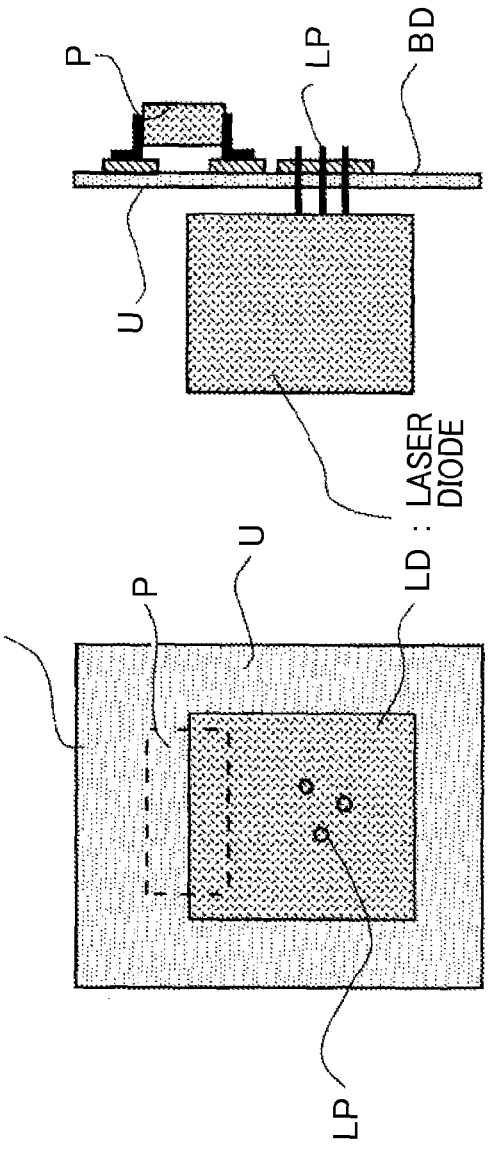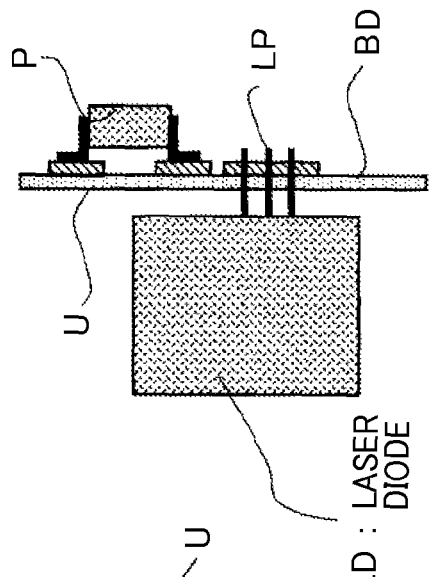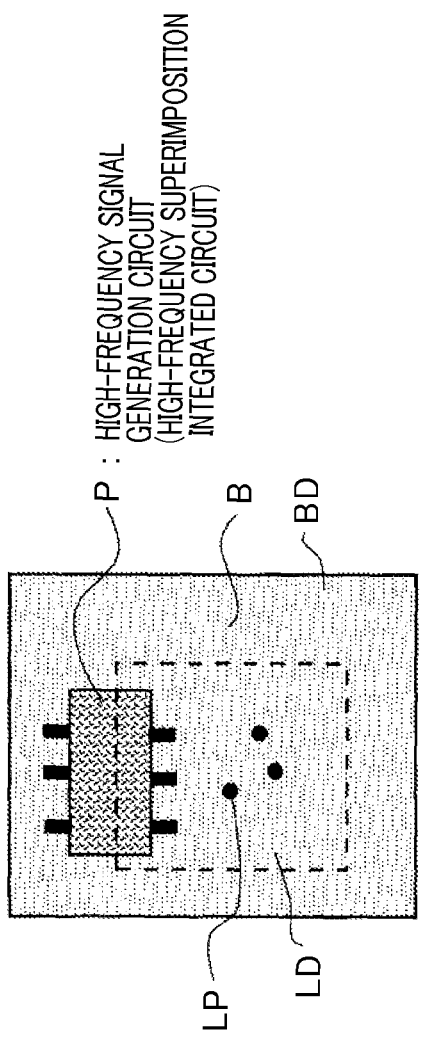

OPTICAL PICKUP APPARATUS

CROSS-REFERENCE TO RELATED APPLICATIONS

This is a continuation of U.S. patent application Ser. No. 13/023,433 filed on Feb. 8, 2011, entitled, "Optical Pickup Apparatus", now U.S. Pat. No. 8,295,147, which claims the benefit of priority to Japanese Patent Application Nos. 2010-32123, 2010-40412, and 2011-11792 filed Feb. 17, 2010, Feb. 25, 2010, and Jan. 24, 2011, respectively, of which full contents are incorporated herein by reference.

BACKGROUND OF THE INVENTION

1. Field of the Invention

The present invention relates to an optical pickup apparatus configured to perform an operation of reading a signal recorded in an optical disc and an operation of recording a signal in an optical disc by a laser beam.

2. Description of the Related Art

Optical disc devices have been widespread each of which is configured to irradiate a signal recording layer of an optical disc with a laser beam emitted from an optical pickup apparatus, to perform a signal reproduction operation and a signal recording operation.

The optical disc devices, which employ optical discs called CD or DVD, are generally spread, but those employing optical discs with improved recording density, that is, optical discs of the Blu-ray standard, have been developed. As the laser beam with which a reading operation of a signal recorded in an optical disc of the Blu-ray standard is performed, a laser beam having a short wavelength, e.g., a blue-violet light having a wavelength of 405 nm, is used.

An optical pickup apparatus is configured to collect a laser beam emitted from a laser diode onto a signal recording layer provided in an optical disc by a light collecting operation of an objective lens, as well as to irradiate a photodetector with return light, which is a laser reflected from the signal recording layer. That is, a focus error signal or a tracking error signal is generated from a signal obtained with a change in light amount or a change in position of the laser beam applied to a quadrant sensor or the like included in the photodetector, and a displacement position of the objective lens is controlled using these signals, so that the operation of reading a signal recorded in the optical disc and the like is performed.

In the optical pickup apparatus configured to perform such operations, not only the photodetector but also a light-emitting surface of the laser diode is irradiated with the return light reflected from the signal recording layer. If the light-emitting surface of the laser diode is irradiated with the return light, the laser beam is modulated, which causes a problem of a phenomenon called laser beam noise.

As a method of solving such a problem caused by the return light, a method of superimposing a high-frequency signal on a driving signal of the laser diode is commonly adopted. Such a method is called a high-frequency superimposing method, and since a spectrum of a laser beam emitted from a laser diode can be made into a multimode by superimposition of a high frequency current, coherence of the laser beam can be reduced, and as a result, laser beam noise caused by reflected light from an optical disc can be reduced.

Japanese Patent Laid-Open Publication No. 2004-192705 as Patent Document describes such an art as to be configured so that a superimposition IC that generates a high-frequency signal is arranged on a flexible wiring board and a high-frequency signal is supplied to a laser diode that is fixed to the flexible board via a wiring pattern formed on the flexible board.

In such a configuration, since the length of a wiring pattern WR, through which the high-frequency signal flows, is long, thereby causing a problem that so-called unnecessary radiation occurs, that is, an unnecessary signal that adversely affects other circuits is emitted from the wiring pattern.

FIG. 9 illustrates an outline of the above-described configuration in which a laser diode 100 is fixed to a flexible wiring board FS1. A lead terminal L extending from this laser diode 100 is soldered to the wiring board FS1, and a flexible sheet FS2 is prepared, which is integral with or separate from the wiring board FS1. The whole of the flexible sheet FS2 is formed in an elongated shape, a wide width portion W is formed in the middle, and a high-frequency superimposition integrated circuit (hereinafter referred to as a superimposition IC) (P1) is mounted to the wide width portion W.

The laser diode 100 is bonded and fixed to a plastic housing, and the other end of this flexible sheet FS2 is folded and soldered to a printed board provided on the back side of the housing.

As described above, since the flexible sheet FS2 is provided in an elongated state and a high-frequency signal flows through the wiring, unnecessary radiation is emitted. Further, a loop circuit or the like is configured, thereby causing a problem that electromagnetic noise is received therein or emitted therefrom.

SUMMARY OF THE INVENTION

An optical pickup apparatus according to an aspect of the present invention, which is configured to prevent noise caused by return light by superposing a high-frequency signal, generated from a high-frequency signal generation circuit, on a driving signal to be supplied to a laser diode, the optical pickup apparatus includes: a high-frequency superimposition integrated circuit including the high-frequency signal generation circuit; first wiring connected between an anode of the laser diode and the high-frequency superimposition integrated circuit; and second wiring connected between a cathode of the laser diode and the high-frequency superimposition integrated circuit, the laser diode and the high-frequency superimposition integrated circuit mounted on a circuit board, the first wiring and the second wiring arranged, for the most part, in a region where the laser diode is arranged, the second wiring configured to pass through between an anode terminal of the laser diode and an anode terminal of a monitor diode.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which:

FIG. 4A is a diagram illustrating a circuit board module employed in an optical pickup apparatus according to an embodiment of the present invention, and particularly is a diagram illustrating a laser module viewed from a top face (U);

FIG. 4B is a diagram illustrating a circuit board module employed in an optical pickup apparatus according to an embodiment of the present invention, and particularly is a diagram illustrating a laser module viewed from a back face (B);

FIG. 4C is a diagram illustrating a circuit board module employed in an optical pickup apparatus according to an embodiment of the present invention, and particularly is a diagram illustrating a laser module viewed from a right side of FIG. 4A;

DETAILED DESCRIPTION OF THE INVENTION

At least the following details will become apparent from descriptions of this specification and of the accompanying drawings.

In an optical pickup apparatus according to an embodiment of the present invention, a laser diode is mounted on one face of a circuit board, a high-frequency superimposition integrated circuit including a high-frequency signal generation circuit is arranged on the other face of the circuit board, and the circuit board has an area greater than or equal to an area occupied by a lead pin of the laser diode and has the area smaller than or equal to twice the size of a region where the laser diode is mounted.

Also, the high-frequency superimposition integrated circuit has a lead and is packaged, and at least a part of the lead or at least a part of an outline of the package is arranged in a region between a region where the lead pin of the laser diode is arranged and an outline of the laser diode.

According to the optical pickup apparatus of an embodiment of the present invention, the high-frequency superimposition integrated circuit including a high-frequency signal generation circuit is arranged on one face of a double-sided printed wiring board and the laser diode is arranged on the other side face, which leads to shorten the length of a signal path through which the high-frequency signal to be supplied to the laser diode from the high-frequency superimposition integrated circuit flows. Thus, such an effect is exerted that the magnitude of an unnecessary radiation signal can be reduced.

According to the optical pickup apparatus of an embodiment of the present invention, a high-frequency signal wiring pattern, through which a high-frequency signal flows, is provided on a face of the double-sided printed wiring board, on which the high-frequency superimposition integrated circuit is arranged, and in a position opposed to the high-frequency signal wiring pattern on a face opposite to that thereof, a wiring pattern which causes unnecessary radiation is not allowed to be arranged. Thus, such an advantage is brought about that the magnitude of the unnecessary radiation signal can be drastically reduced.

Figure 3:
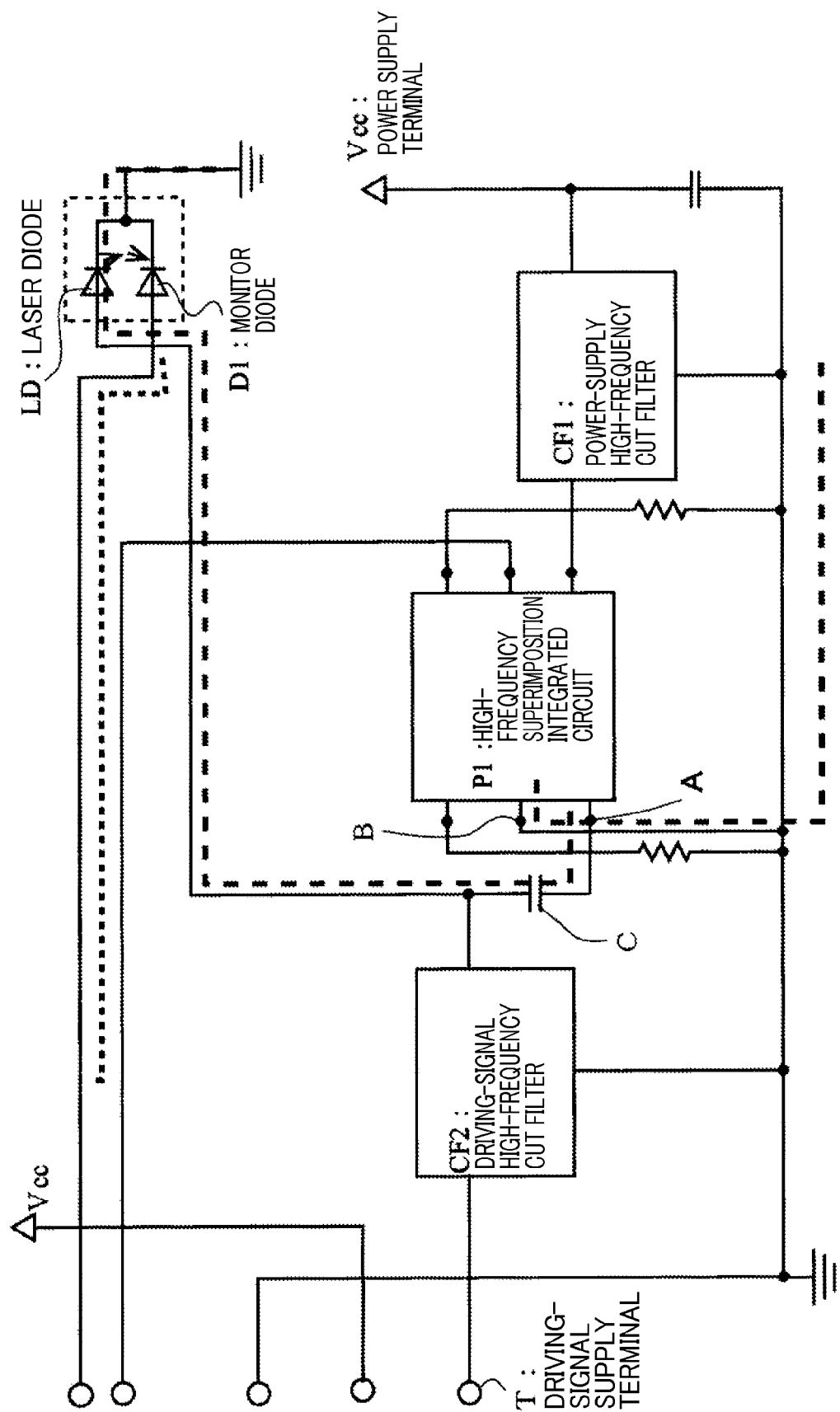
FIG. 3 is a diagram illustrating a laser driving circuit of an optical pickup apparatus according to an embodiment of the present invention.

In the case of an embodiment of the present invention, as shown in FIG. 3, in an optical pickup apparatus configured to prevent noise caused by return light by supplying to the laser diode LD a driving signal on which a high-frequency signal is superposed, the problem with respect to unnecessary radiation is solved with a configuration which will be described below.

First, referring to FIG. 3, an embodiment of a laser diode driving circuit included in the optical pickup apparatus will be described.

In this figure, Vcc represents a power-supply terminal to be supplied with power supply voltage, CF1 represents a power-supply high-frequency cut filter which is provided in order to cut off a high-frequency signal flowing through a power-supply circuit, and P1 represents a high-frequency superimposition integrated circuit including a high-frequency signal generation circuit configured to generate a high-frequency signal to be superimposed on the driving signal that is supplied to the laser diode LD, which will be described later.

T represents a driving-signal supply terminal to be supplied with the driving signal of the laser diode, and CF2 represents a driving-signal high-frequency cut filter which is provided in order to cut off a high-frequency signal flowing through a supply path of the driving signal.

LD represents a laser diode, which emits a blue-violet laser beam having a wavelength of 405 nm, for example, and which is configured such that the high-frequency signal outputted from the high-frequency superimposition integrated circuit P1 is supplied to an anode via a capacitor C and the driving signal is supplied via the driving-signal high-frequency cut filter CF2. That is, the driving signal is supplied to the anode of the laser diode LD via the driving-signal high-frequency cut filter CF2, and on this driving signal, the high-frequency signal outputted from the high-frequency superimposition integrated circuit P1 is superimposed and supplied.

D1 represents a monitor diode, which is provided in a location irradiated with a laser beam emitted from the laser diode LD and which is configured such that a signal according to the laser output level is outputted as a monitor signal.

In the above configuration, the driving signal inputted from the driving-signal supply terminal T is supplied to the laser diode LD via the driving-signal high-frequency cut filter CF2, as well as the high-frequency signal generated in the high-frequency superimposition integrated circuit P1 including the high-frequency signal generation circuit, which is configured to be oscillated and operated, is superimposed on the driving signal and supplied by a power voltage supplied from the power-supply terminal Vcc via the power-supply high-frequency filter CF1.

If the laser diode LD is supplied with the above driving signal on which the high-frequency signal is superimposed, the spectrum of the laser beam emitted from the laser diode LD can be made into multimode, and therefore coherence of the laser beam can be reduced. As a result, laser noise caused by reflection light from a signal recording layer of an optical disc can be reduced.

The laser diode driving circuit employed in the optical pickup apparatus is configured as described above.

Figure 2:
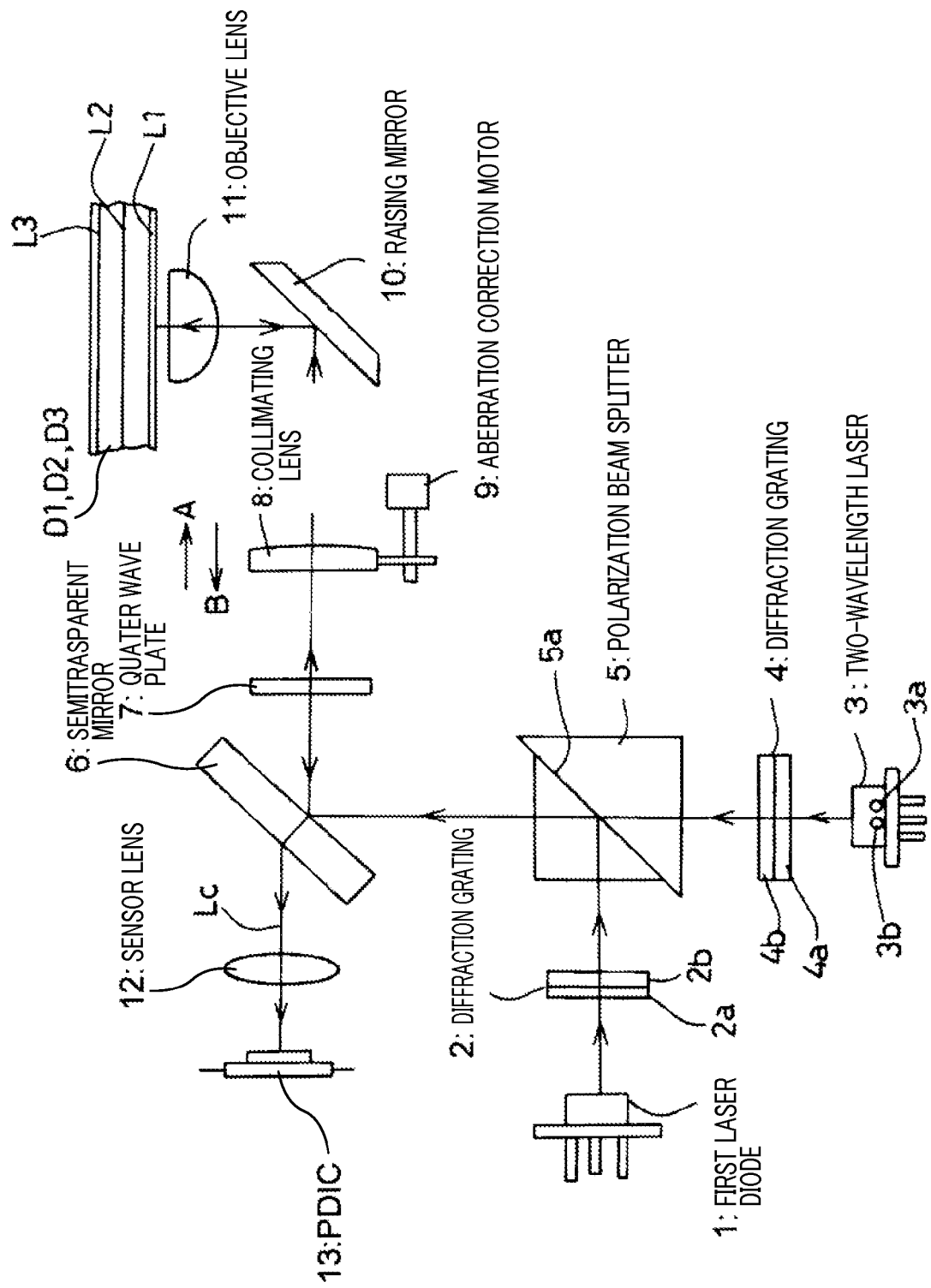
FIG. 2 is a diagram illustrating an optical system of an optical pickup apparatus according to an embodiment of the present invention.

Subsequently, illustrated in FIG. 2 is an optical pickup apparatus, which is so configured as to perform an operation of reading signals in optical discs of three different types of standards using a single objective lens. Two objective lenses may be provided, that is, one for BD and the other for CD/DVD.

In FIG. 2, reference numeral 1 designates a first laser diode configured to emit a first laser beam, which is blue-violet light having a wavelength of 405 nm, for example. Reference numeral 2 designates a first diffraction grating. This first diffraction grating 2 includes a diffraction grating portion 2a on the front and a half-wave plate 2b. The former is a portion which the first laser beam emitted from the above-described first laser diode 1 first enters, and is the diffraction grating portion 2a that splits the laser beam into a main beam, which is 0th-order light, and two sub-beams, which are +1st-order light and −1st-order light; while the latter is the half-wave plate 2b that converts the incident laser beam into linearly polarized light in an S direction.

Reference numeral 3 designates a two-wavelength laser diode. This laser diode is provided in a single case with a laser chip 3a including a second laser diode configured to emit a second laser beam, which is red light having a wavelength of 655 nm, for example, and a laser chip 3b including a third laser diode configured to emit a third laser beam, which is infrared light having a wavelength of 785 nm, for example.

Reference numeral 4 designates a diffraction grating, which the second laser beam and the third laser beam emitted from the two-wavelength laser diode 3 enter. This diffraction grating includes: a diffraction grating portion 4a that splits the laser beam into a main beam, which is a 0th-order light, and two sub-beams, which are +1st-order light and −1st-order light; and a half-wave plate 4b that converts incident laser beam into linearly polarized light in a P direction.

Reference numeral 5 designates a polarizing beam splitter. This polarizing beam splitter is provided in a location on which the first laser beam having passed through the first diffraction grating 2 and the second laser beam and the third laser beam having passed through the second diffraction grating 4 are incident, and includes a control film 5a that reflects the laser beam having been converted by the half-wave plate 2b into S-polarized light and that causes the laser beam having been converted by the half-wave plate 4b in the P direction to pass therethrough.

Reference character 6 designates a semitransparent mirror, which reflects the first laser beam reflected by the polarizing beam splitter 5 and the second laser beam and the third laser beam having passed through the polarizing beam splitter 5, on an outward path of the optical path, and which causes those beams to pass therethrough on a return path of the optical path.

Reference numeral 7 designates a quarter-wave plate, which is provided in a location where the laser beam reflected by the semitransparent mirror 6 enters and which has a function of converting the incident laser beam from linearly polarized light to circularly polarized light, or to the contrary, from the circularly polarized light to the linearly polarized light. Reference numeral 8 designates a collimating lens, which is configured such that the laser beam having passed through the quarter-wave plate 7 enters as well as the incident laser beam is converted into parallel light, and which is configured so as to be displaced by an aberration correction motor 9, in the optical axis direction, that is, in directions of an arrow A and an arrow B. A configuration is such that spherical aberration caused due to a thickness of a protective layer of an optical disc is corrected by the displacement operation of the collimating lens 8 in the optical axis direction.

Reference numeral 10 designates a raising mirror, which is provided in a location where the laser beam having passed through the collimating lens 8 is incident, and is configured such that the incident laser beam is reflected in the direction of an objective lens 11.

L1 indicates a location of a signal recording layer in a first optical disc D1 in which a distance from the surface of the optical disc to the signal recording layer is short, L2 indicates a location of a signal recording layer in a second optical disc D2 in which a distance from the surface of the optical disc to the signal recording layer is longer than that of the first optical disc D1, and L3 indicates a location of the signal recording layer in a third optical disc D3 in which a distance from the surface of the optical disc to the signal recording layer is longer than that of the second optical disc D2.

In the above configuration, the first laser beam emitted from the first laser diode 1 enters the objective lens 11 via the first diffraction grating 2, the polarizing beam splitter 5, the semitransparent mirror 6, the quarter-wave plate 7, the collimating lens 8, and the raising mirror 10, and thereafter, the signal recording layer L1 provided on the first optical disc D1 is irradiated with the first laser beam as a light collection spot by a light collecting operation of the objective lens 11, and the first laser beam incident on the signal recording layer L1 is reflected by the signal recording layer L1 as return light.

Further, the second laser beam emitted from the two-wavelength laser diode 3 enters the objective lens 11 via the second diffraction grating 4, the polarizing beam splitter 5, the semitransparent mirror 6, the quarter-wave plate 7, the collimating lens 8, and the raising mirror 10, and thereafter, the signal recording layer L2 provided on the second optical disc D2 is irradiated with the second laser beam as a light collection spot by the light collecting operation of the objective lens 11, and the second laser beam incident on the signal recording layer L2 is reflected by the signal recording layer L2 as return light.

Then, the third laser beam emitted from the two-wavelength laser diode 3 enters the objective lens 11 via the second diffraction grating 4, the polarizing beam splitter 5, the semitransparent mirror 6, the quarter-wave plate 7, the collimating lens 8, and the raising mirror 10, and then the signal recording layer L3 provided on the third optical disc D3 is irradiated with the third laser beam as a light collection spot by the light collecting operation of the objective lens 11, and the third laser beam incident on the signal recording layer L3 is reflected by the signal recording layer L3 as return light.

The return light reflected from the signal recording layers L1, L2, and L3 provided in the optical discs D1, D2, and D3, respectively, enters the semitransparent mirror 6 via the objective lens 11, the raising mirror 10, the collimating lens 8, and the quarter-wave plate 7. As described above, the return light incident on the semitransparent mirror 6 passes through the semitransparent mirror 6 as a control laser beam Lc.

Reference numeral 12 designates a sensor lens, on which the control laser beam Lc having passed through the semitransparent mirror 6 is incident, and which has a function of adding astigmatism to the control laser beam. Lc and applying it to a light receiving portion provided in a photodetector 13, which is so called PDIC. The photodetector 13 is provided, as a known quadrant sensor or the like, with light receiving portions corresponding to the main beam and two sub-beams of the control laser beam Lc, which are obtained by splitting the laser beam into three beams, respectively, by the diffraction grating 2 or 4, and is configured so as to perform a signal generating operation accompanied by an operation of reading a signal recorded on the signal recording layer of the optical disc D by an irradiation operation of the main beam, a focus error signal generating operation for performing a focusing control operation by the astigmatic method, and a tracking error signal generating operation for performing a tracking control operation by the irradiation operation of the two sub-beams.

In the optical pickup apparatus configured as above, the operation of reading a signal recorded in the first optical disc D1 is performed by supplying a driving signal to the first laser diode 1, the operation of reading a signal recorded in the second optical disc D2 is performed by supplying a driving signal to the laser chip 3a included in the two-wavelength laser diode 3, and the operation of reading a signal recorded in the third optical disc D3 is performed by supplying a driving signal to the laser chip 3b included in the two-wavelength laser diode 3.

The first laser beam emitted from the first laser diode 1 and the second laser beam and the third laser beam emitted from the two-wavelength laser diode enter the objective lens 11 via the polarizing beam splitter 5, the semitransparent mirror 6, the quarter-wave plate 7, the collimating lens 8, and the raising mirror 10 as described above, and are collected, by the light collecting operation of the objective lens 11, onto the signal recording layer L1 of the first optical disc D1, the signal recording layer L2 of the second optical disc D2, and the signal recording layer L3 of the third optical disc D3. The operation of collecting light onto the signal recording layer of each of the optical discs D1, D2, and D3 by the objective lens 11 can be performed with a diffraction ring zone and the like formed on the incident surface side of the objective lens 11 and with numerical aperture also set so as to conform to the standard of each of the optical discs.

As described above, the first laser beam, the second laser beam, and the third laser beam are collected onto the signal recording layer of each of the optical discs and are reflected from each of the signal recording layers as return light. The return light reflected as above is incident on the photodetector 13 via the raising mirror 10, the collimating lens 8, the quarter-wave plate 7, the semitransparent mirror 6, and the sensor lens 12. If the photodetector 13 is irradiated with the return light reflected from the signal recording layer of the optical disc as such, a focus error signal, a tracking error signal, and a data signal can be obtained from the photodetector 13, and thus the control operation of the optical pickup apparatus using these signals is performed as known. As a result, the operation of reading a signal recorded in each optical disc can be performed.

Figure 8:
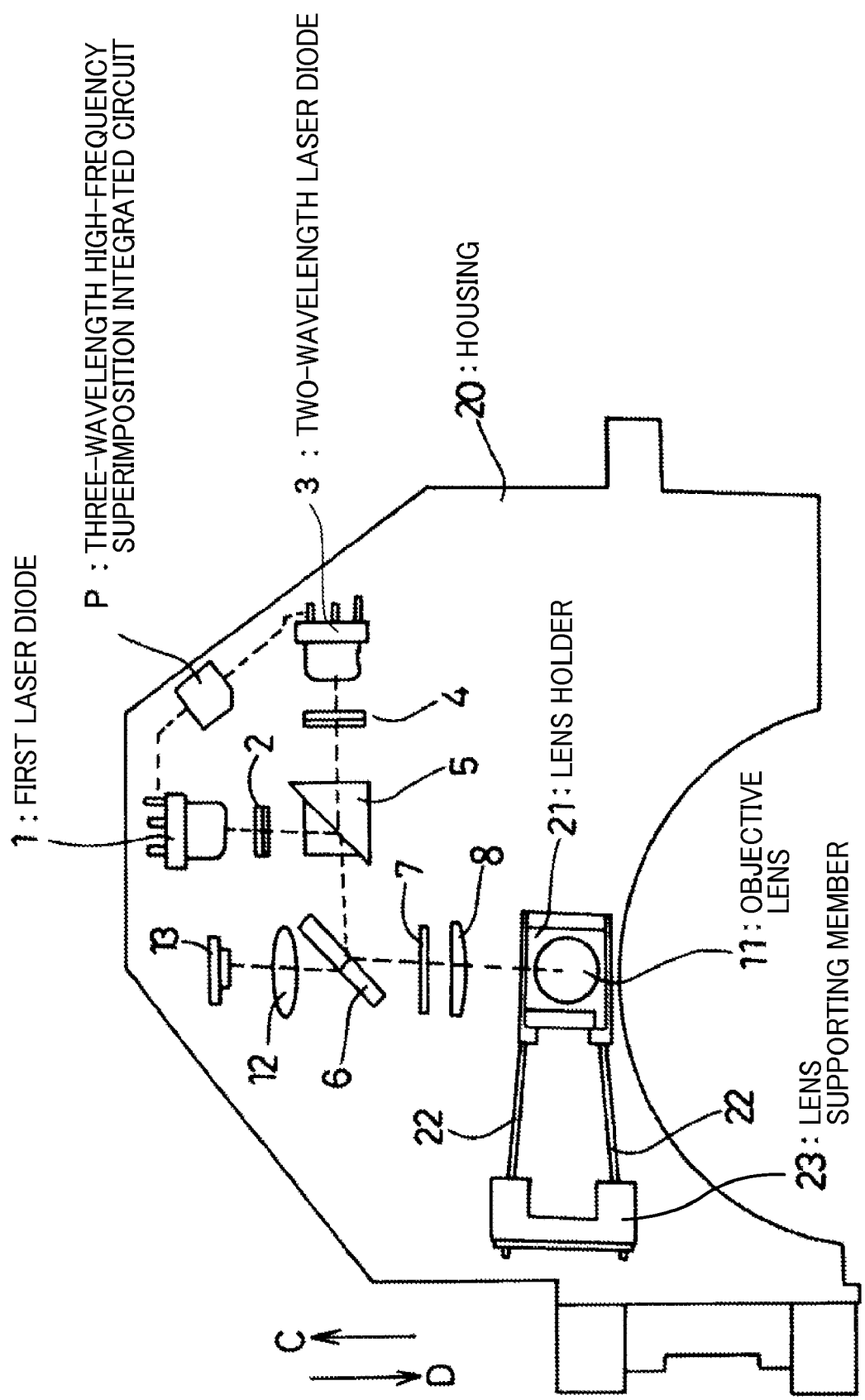
FIG. 8 is a diagram illustrating an optical pickup apparatus.

Subsequently, referring to FIG. 8, a planar configuration of a common optical pickup apparatus will be described in brief.

Reference numeral 20 designates a housing making up an optical pickup apparatus, and the optical pickup apparatus including the same is mounted on a guide provided on a base (chassis) of an optical disc device, and is moved by a motor (not shown) for feeding pickup in directions of an arrow C and an arrow D, which are radial directions of the optical disc. Reference numeral 21 is a lens holder to which the objective lens 11 in FIG. 2 is fixed. Between a lens supporting member 23 and the lens holder fixed to the housing 20, a plurality of wires are provided extending laterally on the upper side and the lower side of the figure, and in the vertical direction with respect to the figure. Here, four supporting wires 22 are provided with two wires thereof on each side, and one end of each of the wires is mounted on a lens supporting portion, while the other end of each of the wires is mounted on the lens holder 21. These wires enable displacement in the focus direction, which is a direction perpendicular to the signal surface of the optical disc, and the tracking direction, which is a radial direction of the optical disc.

The objective lens 11 is capable of being displaced on the housing 20 as described above, but other optical components are fixed in the housing as shown in the figure. In FIG. 8, P designates a three-wavelength high-frequency superimposition integrated circuit (hereinafter, referred to as a superimposition IC). In this superimposition IC (P), three high-frequency signal generation functions are included in order to apply high-frequency signals having different frequencies to the two laser chips 3a and 3b included in the first laser diode 1 and the two-wavelength diode 3.

A flexible printed wiring board is used so as to supply a driving signal from the superimposition IC (P) to the first laser diode 1 and to supply a driving signal from the superimposition IC(P) to the two-wavelength laser diode 3, and the driving signals are supplied via the wiring pattern of the wiring board. However, if the wiring pattern is long or draws a loop, such a problem is caused that unnecessary radiation adversely affecting other circuits.

Considering such unnecessary radiation, in a common optical pickup apparatus, the superimposition IC (P) is configured so as to be arranged in an intermediate position between the first laser diode 1 and the two-wavelength laser diode 3, for example.

With the above described configuration, it is impossible to reduce a distance between the superimposition IC (P) and the first laser diode 1, and a distance between the superimposition IC (P) and the two-wavelength laser diode 3, which leads to such a problem that unnecessary radiation is increased which is generated from the wiring pattern through which a high-frequency signal flows.

Figure 1:
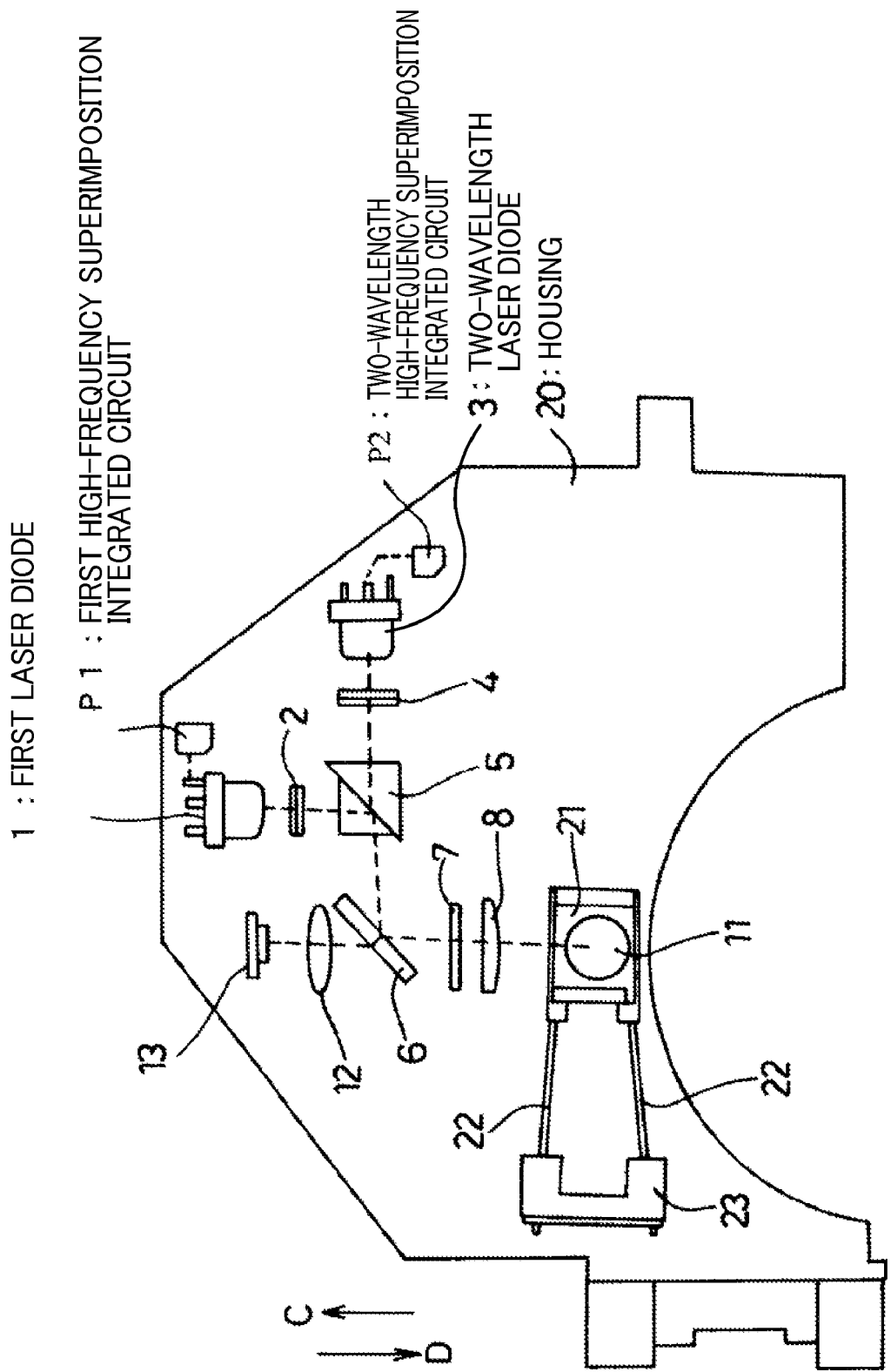
FIG. 1 is a diagram illustrating an optical pickup apparatus according to an embodiment of the present invention.

Subsequently, a description will be made referring to FIG. 1. FIG. 1 shows an example illustrating a configuration of the optical pickup apparatus according to an embodiment of the present invention, and the same components as those in FIG. 8 are designated by the same reference numerals.

In an embodiment of the present invention, a high-frequency signal to be supplied to the first laser diode 1 is generated, a first high-frequency superimposition integrated circuit including an integrated circuit (superimposition IC (P1)) is arranged in the vicinity of the first laser diode 1, and a two-wavelength high-frequency superimposition integrated circuit (superimposition IC (P2) (P2)) that generates high-frequency signals with different frequencies are arranged in the vicinity of the two-wavelength laser diode 3.

According to the above described configuration, in order to supply to the first laser diode 1 the driving signal on which the high-frequency signal generated from the superimposition IC (P1) is superimposed, a wiring board is employed, and the length of a wiring pattern provided on the wiring board can be reduced. Similarly, the driving signal on which the high-frequency signal generated from the superimposition IC (P2) is superimposed, is supplied to the two laser chips 3a and 3b included in the two-wavelength laser diode 3, and the length of the wiring pattern can be also reduced.

As such, since the length of the wiring pattern, which is a supply path for a high-frequency signal, can be reduced, unnecessary radiation emitted from the wiring pattern can be reduced.

The second laser diode that emits the second laser beam and the third laser diode that emits the third laser beam are configured as the two-wavelength laser diode 3, but they may be configured as separate laser diodes.

In this case, three high-frequency superimposition ICs that generate high-frequency signals corresponding to the three laser diodes are provided and arranged in the vicinity of laser diodes, respectively.

They can be employed in an optical pickup apparatus capable of performing an operation of reading a signal recorded in two different optical discs. In this case, as well, they are arranged in the vicinity of laser diodes, respectively.

Subsequently, an example of the above-described state where "the superimposition IC is arranged in the vicinity of each laser diode" will be described referring FIGS. 4A to 4C and to FIG. 7.

FIGS. 4A to 4C illustrate a laser module using a wiring board BD made up of a printed board, a flexible sheet or a ceramic substrate, and a laser diode LD, configured being housed in a laser holder, is fixed to the laser module. The concept of the arrangement in the vicinity thereof will be described below. FIG. 4A is a diagram illustrating the laser module when seen from a top face (U), FIG. 4B is a diagram when FIG. 4A is seen from the back face B, and FIG. 4C is a diagram when seen from the right side of FIG. 4A.

Figure 9:
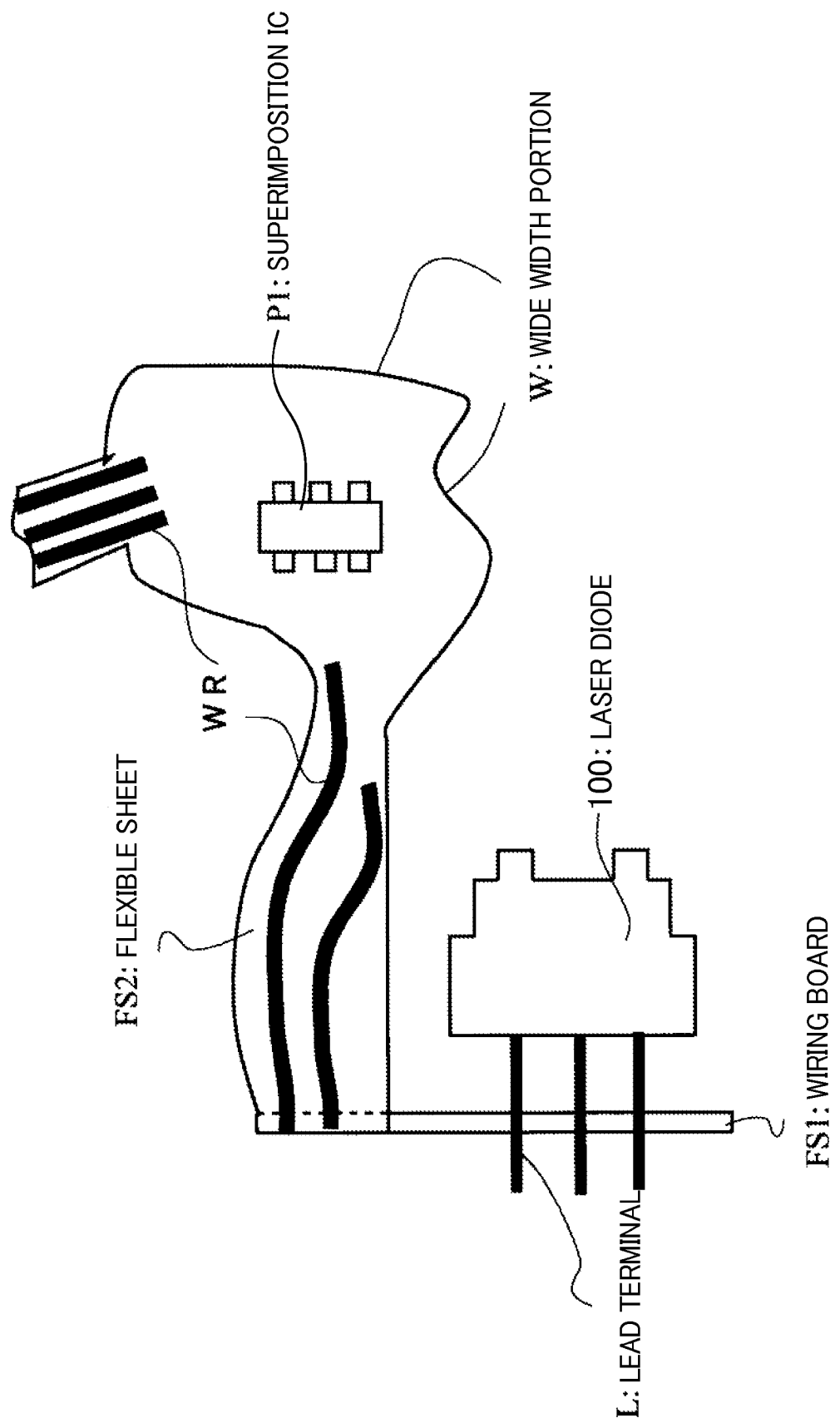
FIG. 9 is a diagram illustrating a flexible sheet employed in an optical pickup apparatus.

First, on a circuit board BD including a conductive pattern at least on a front face U or the back face B, the laser diode LD is electrically fixed by soldering. On this circuit board BD, a high-frequency superimposition integrated circuit (hereinafter referred to as a superimposition IC (P)) is mounted. In FIG. 9, the superimposition IC is not on the wiring board FS1 where the laser diode is fixed, but it is fixed in the middle of the elongated flexible sheet, thereby causing a problem of unnecessary radiation or the like. However, as shown in FIGS. 4A to 4C, since the laser diode LD and the superimposition IC (P) are mounted on the board BD, which is slightly larger than or smaller than the back face of the laser diode LD, the wiring pattern results in being very short. Since the superimposition IC (P) is arranged on the back face B of the wiring board BD, the superimposition IC can be arranged closer to the laser diode LD.

The laser diodes are mainly divided into those of a can type and those of a frame type, and the former type has a diameter of 5.6 mm, and a circuit board, on which this laser diode is mounted, may have a size of approximately 1×1 cm to 5×5 mm, while a circuit board for the latter frame type may have a size of 2.5×5 mm.

A portion actually connected to the conductive pattern of the circuit board BD is three lead pins projecting from the package, and the size may be approximately an area occupied by these three lead pins.

Preferably, the circuit board has an area greater than that occupied by the lead pins and approximately twice the size of the area where the laser diode is mounted.

In an embodiment of the present invention, noise is further reduced with this superimposition IC being arranged on the back face of the circuit board BD. As described above, in either of a can type and a frame type, the size thereof is determined not based on an incorporated chip but based on the outline of the package. Thus, if the superimposition IC is mounted on the front side U of the circuit board BD, such a configuration that the superimposition IC is brought into contact with the outline of the package is the closest arrangement. However, in the case of the back face B, since there is an empty space between the outline of the package and the lead pin of the laser diode LD, the arrangement can be made closer to the lead pin LP. That is, in the figure, at least apart of the lead of the superimposition IC or at least a part of a resin seal portion of the superimposition IC is arranged between the region where the lead pin is arranged and the outline of the package of the laser diode LD, thereby enabling a close arrangement.

If the superimposition IC (P) is a flip chip type, the close arrangement can be realized such that a terminal on the chip surface is provided in a space between the package outline of the LD and the region where the lead pin LP is arranged.

Here, such a description was made that the conductive pattern of the circuit board is provided either one of the front face and the back face, but an example will be made bellow in which the patterns are provided on both of the faces referring FIGS. 5 and 6.

Figure 5:
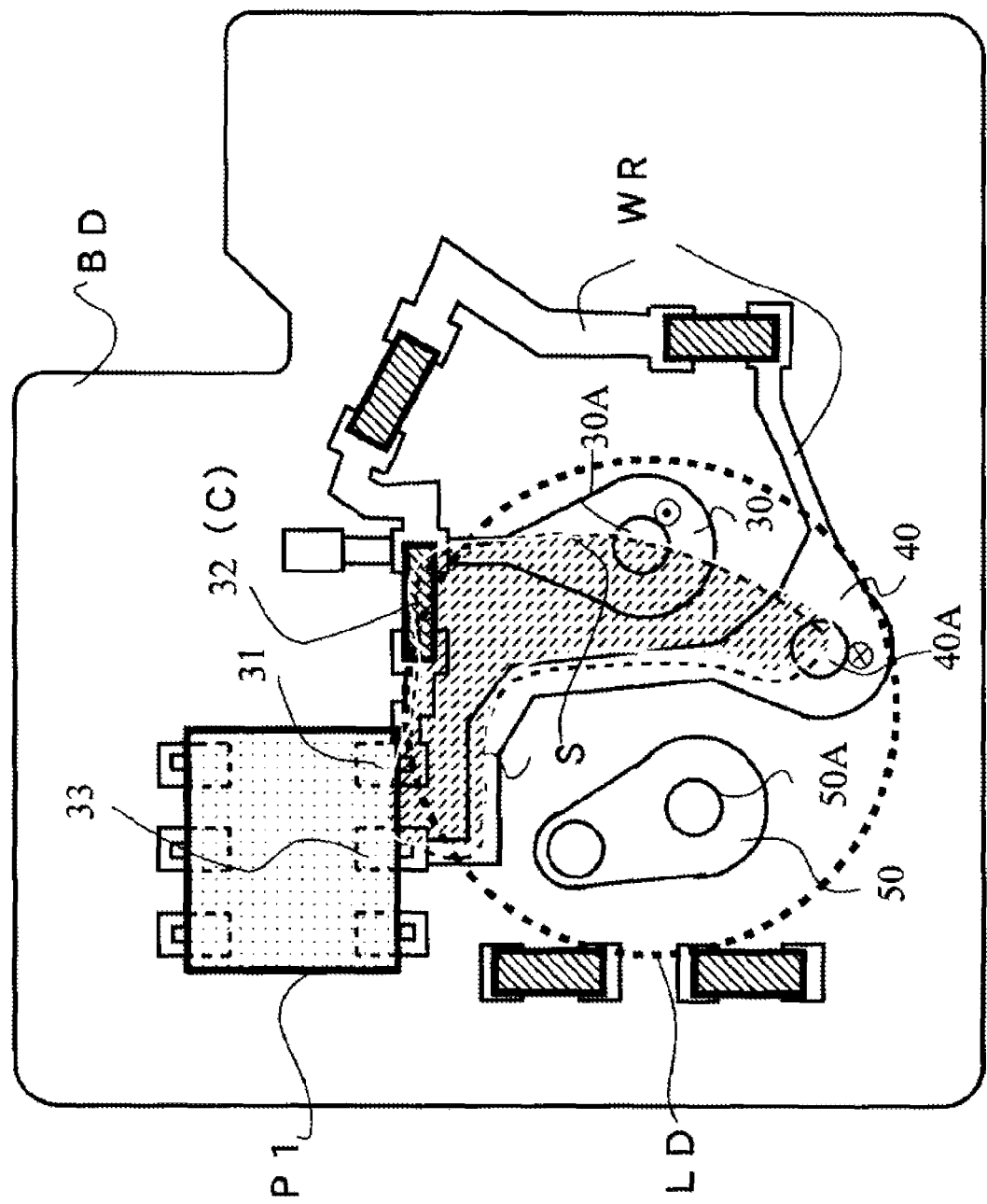
FIG. 5 is a diagram illustrating a circuit board employed in FIGS. 4A to 4C.

FIG. 5 illustrates a wiring pattern WR formed on the side on which at least the high-frequency superimposition IC (P1) is arranged in FIG. 3, and the superimposition IC (P1) is electrically fixed to the upper left in FIG. 5 by soldering.

In the same figure, the laser diode is fixed to the back side of the figure. Reference numeral 30 designates an anode terminal to which an anode of the laser diode LD is soldered, and a through hole 30A through which the anode terminal is inserted is formed at the center part thereof. Reference character 40 is a cathode terminal to which a cathode of the laser diode LD and a cathode of the monitor diode D1 are soldered, and a through hole 40A through which the cathode terminal of the laser diode LD and the cathode of the monitor diode D1 are inserted is formed at the center thereof. Also, reference numeral 50 designates an anode terminal to which an anode of the monitor diode D1 is soldered, and a through hole 50A through which the anode is inserted is formed at the center part thereof.

In the laser diode driving circuit shown in FIG. 3, a high-frequency signal outputted from the superimposition IC (P1) is supplied to the anode terminal 30 of the laser diode LD via a capacitor C from a high-frequency signal output terminal A provided on the superimposition IC (P1), as well as is supplied to the laser diode LD by being returned to the cathode 40 of the laser diode LD arranged on the back face of the double-sided printed wiring board BD and to a grounding terminal B provided on the superimposition IC (P1) via a grounding pattern EP.

The high-frequency signal outputted from the superimposition IC (P1) is supplied to the laser diode LD through the above-described path, but the flow of the high-frequency signal becomes substantially a path indicated by an S curve in FIG. 5.

That is, the path draws the S shape from the terminal 31—the capacitor 32—the anode terminal 30—the LD on the back of the figure—the cathode terminal 40 from the LD on the back of the figure—the terminal 33. The path is indicated by a dotted line in FIG. 3. A portion indicated by a dotted circle is a region where the laser diode LD is arranged, and a half to most of the curve S is arranged within this circle. Considering the size of the laser diode, this path is a limited area, and since the wiring pattern WR can be reduced, the magnitude of the unnecessary radiation signal can be reduced. Here, the wiring from the terminal 40 to the terminal 33 is brought closer to the capacitor 32(C). Thus, the area of the S shape can be reduced, and an area where the unnecessary radiation occurs can be suppressed.

Subsequently, the wiring pattern WR formed on the face on the opposite side will be described referring to FIG. 6. FIG. 6 is a diagram when the pattern on the back face is seen through from the face in FIG. 5, and the conductive pattern WR is formed on the back face of the circuit board, while a grounding pattern EP is further provided on the depth side of the figure.

Figure 6:
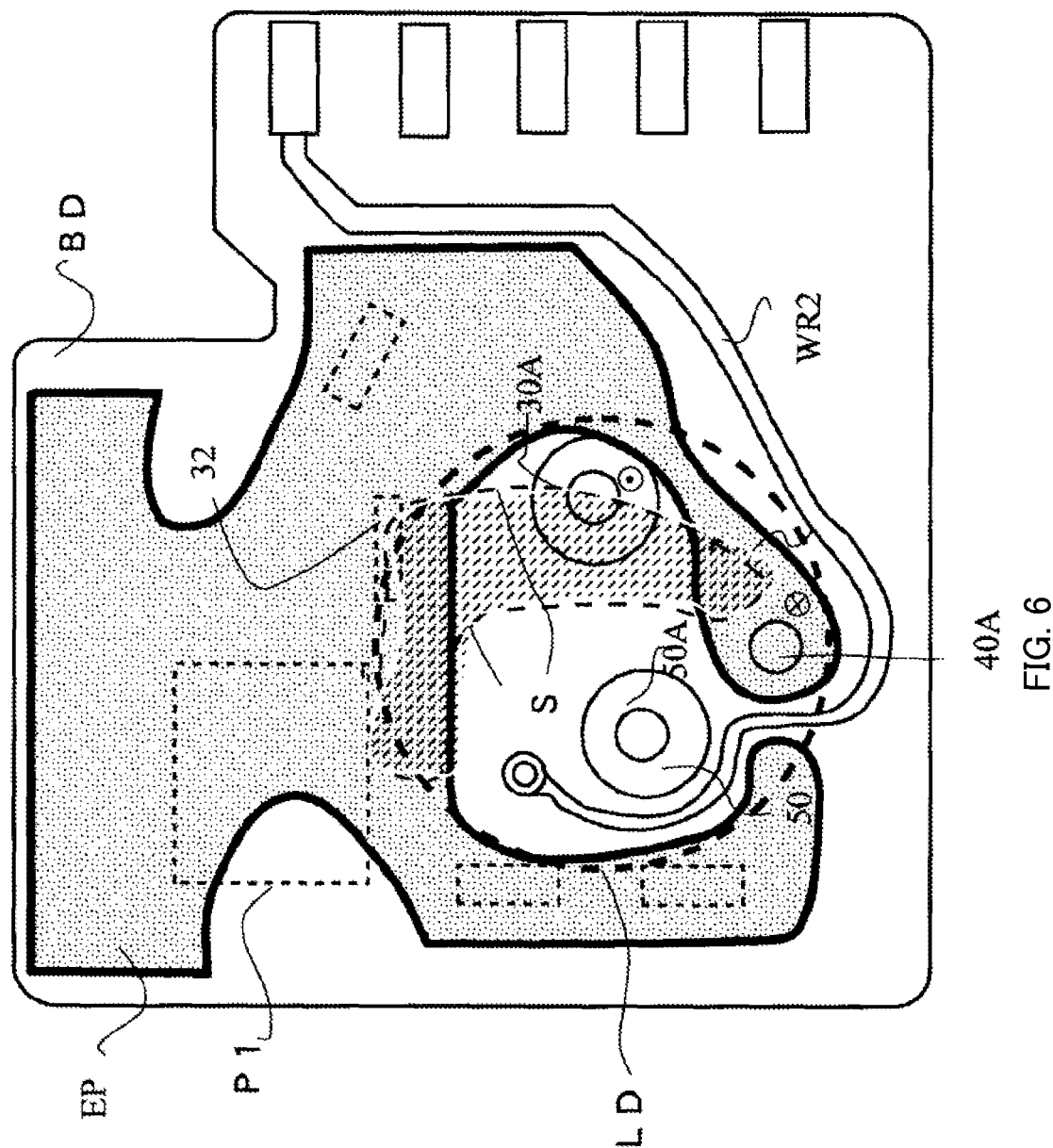
FIG. 6 is a diagram illustrating a circuit board employed in FIGS. 4A to 4C.

In FIG. 6, a bold solid line indicates the grounding pattern EP, which is formed so as to occupy a large area of the double-sided printed wiring board BD. In this figure, the superimposition IC (P1) is fixed, by soldering, to a location indicated by a dotted line. Also, the curve S described in FIG. 5 is left as a thin dotted line in order to have the location recognized.

On the back face of the double-sided printed wiring board BD according to an embodiment of the present invention, the wiring pattern WR2 is arranged keeping away from the range surrounded by the S curve. This wiring is wiring of a portion indicated by the thin dotted line in FIG. 3, that is, the wiring on the anode side of the monitor diode.

The high-frequency signal outputted from the superimposition IC (P1) flows through the closed loop, and unnecessary radiation is caused by the loop, and if the wiring pattern WR2 passes through the S-shaped region, the wiring WR2 functions as an antenna and outputs noise to the outside. However, the wiring pattern WR2 extends to the outside of the loop and not arranged inside thereof, thereby suppressing such a problem that the noise caused by the unnecessary radiation comes into this wiring pattern WR2.

Figure 7:
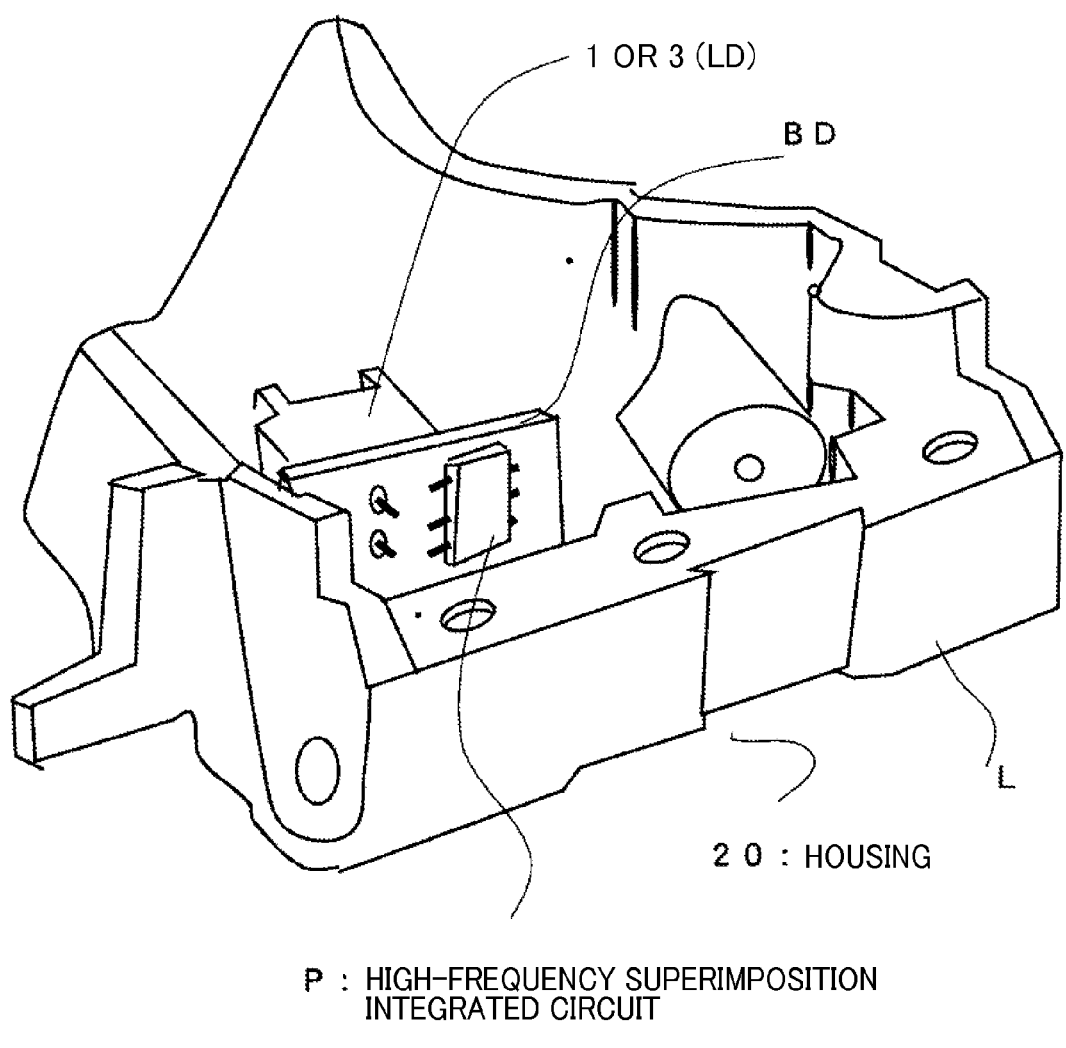
FIG. 7 is a diagram illustrating a circuit board in FIGS. 4A to 4C in a state of being mounted on a housing.

FIG. 7 is a schematic diagram according to an embodiment of the present invention and illustrates a laser diode module that employs the circuit board BD provided with the laser diode housed in the laser holder. The housing 20 made of plastic has the outer periphery thereof formed by a side wall L. This module is mounted inside this side wall L. There is a projecting piece for fixing that projects inward from the side wall, and to this projecting piece, the circuit board and the laser diode are fixed via an adhesive.

This circuit board BD is electrically fixed to another circuit board provided on the back of the housing.

An embodiment of the present invention can be employed, not only in an optical pickup apparatus used for reading a signal recorded in an optical disc of the Blu-ray standard, but also in an optical pickup apparatus used for reading a signal recorded in an optical disc of the CD standard and an optical disc of the DVD standard.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. An optical pickup apparatus configured to prevent noise caused by return light by superposing a high-frequency signal, generated from a high-frequency signal generation circuit, on a driving signal to be supplied to a laser diode, the optical pickup apparatus comprising:

a high-frequency superimposition integrated circuit including the high-frequency signal generation circuit;
first wiring connected between an anode of the laser diode and the high-frequency superimposition integrated circuit; and
second wiring connected between a cathode of the laser diode and the high-frequency superimposition integrated circuit,
the laser diode and the high-frequency superimposition integrated circuit mounted on a circuit board,
the first wiring and the second wiring arranged, for the most part, in a region where the laser diode is arranged,
the second wiring configured to pass through between an anode terminal of the laser diode and an anode terminal of a monitor diode.

2. The optical pickup apparatus according to claim 1, wherein the second wiring is brought closer to the first wiring.

3. The optical pickup apparatus according to claim 1, wherein the laser diode is mounted on one face of the circuit board, and the high-frequency superimposition integrated circuit is mounted, in vicinity of the laser diode, on an other face of the circuit board.

4. The optical pickup apparatus according to claim 2, wherein
the laser diode is mounted on one face of the circuit board, and the high-frequency superimposition integrated circuit is mounted, in vicinity of the laser diode, on an other face of the circuit board.

5. The optical pickup apparatus according to claim 1, wherein
wiring on an anode side of the monitor diode bypasses a region where the first wiring and the second wiring are provided.

* * * * *

UNITED STATES PATENT AND TRADEMARK OFFICE
CERTIFICATE OF CORRECTION

| | |
|---|---|
| PATENT NO. | : 8,395,983 B2 |
| APPLICATION NO. | : 13/624568 |
| DATED | : March 12, 2013 |
| INVENTOR(S) | : Takanashi et al. |

It is certified that error appears in the above-identified patent and that said Letters Patent is hereby corrected as shown below:

In the Specification

Column 9, line 48: replace --apart-- with "a part".

Signed and Sealed this
Twenty-fourth Day of September, 2013

Teresa Stanek Rea
*Deputy Director of the United States Patent and Trademark Office*